(12) United States Patent
Bogdan et al.

(10) Patent No.: US 10,275,444 B2
(45) Date of Patent: Apr. 30, 2019

(54) DATA ANALYTICS SYSTEM AND METHODS FOR TEXT DATA

(71) Applicant: AT&T INTELLECTUAL PROPERTY I, LP, Atlanta, GA (US)

(72) Inventors: Pamela Bogdan, Neptune, NJ (US); Gary Gressel, Lenexa, KS (US); Gary Reser, Marietta, GA (US); Alex Rubarkh, Richboro, PA (US); Kenneth Shirley, South Orange, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 19 days.

(21) Appl. No.: 15/211,837

(22) Filed: Jul. 15, 2016

(65) Prior Publication Data
US 2018/0018316 A1    Jan. 18, 2018

(51) Int. Cl.
G06F 17/00    (2006.01)
G06F 17/27    (2006.01)
G06F 17/30    (2006.01)

(52) U.S. Cl.
CPC ...... G06F 17/2715 (2013.01); G06F 17/2785 (2013.01); G06F 17/30598 (2013.01)

(58) Field of Classification Search
CPC ............. G06F 17/2785; G06F 17/2765; G06F 17/30011; G06F 17/20; G06F 17/21; G06F 17/30598; G06F 17/30684; G06N 5/022
See application file for complete search history.

(56) References Cited

U.S. PATENT DOCUMENTS

| 4,849,898 A | 7/1989 | Adi |
| 5,371,673 A | 12/1994 | Fan |

(Continued)

FOREIGN PATENT DOCUMENTS

| CN | 102567464 A | 7/2012 |
| CN | 103026356 A | 4/2013 |

(Continued)

OTHER PUBLICATIONS

Blei, et al., Latent dirichlet allocation. the Journal of machine Learning research 3 (2003): 993-1022., 2003.

(Continued)

*Primary Examiner* — Edgar X Guerra-Erazo
(74) *Attorney, Agent, or Firm* — Guntin & Gust, PLC; Ralph Trementozzi

(57) ABSTRACT

Aspects of the subject disclosure may include, for example, a computer that performs a statistical natural language processing analysis on a plurality of text documents to determine a plurality of topics, creates a proper subset of topics from the plurality of topics, based on user input, maps one or more topics in the proper subset of topics to each document in the plurality of text documents, thereby creating a plurality of topic-document pairs, identifies n-dimensions of bias for each topic-document pair from the text, creates clusters of topics from the proper subset of topics, and generates presentable content depicting each cluster of the clusters of topics according to a corresponding image configuration. The topics and n-dimensions of bias data can be further analyzed with co-collected structured data for statistical relationships. The topics and n-dimensions of bias data can be used for a publisher-subscriber network that uses content-driven routing when delivering raw data and summarized data via the network. Other embodiments are disclosed.

20 Claims, 16 Drawing Sheets

(56) References Cited

U.S. PATENT DOCUMENTS

| | | | |
|---|---|---|---|
| 5,819,260 A | | 10/1998 | Lu et al. |
| 7,085,771 B2 | | 8/2006 | Chung et al. |
| 7,143,091 B2 | | 11/2006 | Charnock et al. |
| 7,461,033 B1 | | 12/2008 | McConnell et al. |
| 7,523,085 B2 | | 4/2009 | Nigam et al. |
| 7,739,102 B2 | | 6/2010 | Bender et al. |
| 8,176,067 B1 | | 5/2012 | Ahmad et al. |
| 8,311,808 B2 | * | 11/2012 | Tinkler ............... G06F 17/2715 704/1 |
| 8,312,056 B1 | | 11/2012 | Peng et al. |
| 8,356,025 B2 | | 1/2013 | Cai et al. |
| 8,401,980 B2 | * | 3/2013 | Hatami-Hanza ........................... G06F 17/30734 706/12 |
| 8,533,208 B2 | * | 9/2013 | Sundaresan ......... G06F 17/2785 704/9 |
| 8,645,295 B1 | | 2/2014 | Dillard et al. |
| 8,738,361 B2 | * | 5/2014 | Gryc ................... G06F 17/2745 704/9 |
| 8,843,497 B2 | | 9/2014 | Sekine et al. |
| 9,176,969 B2 | | 11/2015 | Asur et al. |
| 9,256,667 B2 | | 2/2016 | Koudas et al. |
| 9,342,591 B2 | | 3/2016 | Inagaki |
| 2003/0154072 A1 | * | 8/2003 | Young ................ G06F 17/30017 704/9 |
| 2005/0210008 A1 | | 9/2005 | Tran et al. |
| 2006/0020916 A1 | | 1/2006 | Allison et al. |
| 2009/0094233 A1 | * | 4/2009 | Marvit ............... G06F 17/30616 |
| 2009/0158429 A1 | | 6/2009 | Alstyne et al. |
| 2009/0204605 A1 | * | 8/2009 | Bai .................... G06F 17/30654 |
| 2013/0018651 A1 | * | 1/2013 | Djordjevic .......... G06F 17/2765 704/9 |
| 2013/0273976 A1 | * | 10/2013 | Rao ..................... H04L 12/1822 455/563 |
| 2014/0019119 A1 | * | 1/2014 | Liu ..................... G06F 17/2229 704/9 |
| 2014/0067370 A1 | | 3/2014 | Brun et al. |
| 2014/0207782 A1 | | 7/2014 | Ravid et al. |
| 2015/0039290 A1 | * | 2/2015 | Alexe ................. G06F 17/2795 704/9 |
| 2015/0039617 A1 | | 2/2015 | Gates et al. |
| 2015/0046151 A1 | | 2/2015 | Lane et al. |
| 2015/0106080 A1 | * | 4/2015 | Miura ................. G06F 17/2785 704/9 |
| 2015/0154148 A1 | * | 6/2015 | Lightner ................. G06N 5/04 704/9 |
| 2015/0169593 A1 | * | 6/2015 | Bogdanova ......... G06F 17/3071 707/738 |
| 2016/0034512 A1 | | 2/2016 | Singhal et al. |
| 2016/0092771 A1 | | 3/2016 | Buckley et al. |
| 2018/0018316 A1 | | 1/2018 | Bogdan et al. |

FOREIGN PATENT DOCUMENTS

| | | |
|---|---|---|
| CN | 103390051 A | 11/2013 |
| EP | 2788907 A2 | 10/2014 |
| JP | 2015032013 A | 2/2015 |
| WO | 2007034179 A1 | 3/2007 |
| WO | 2015099810 | 7/2015 |
| WO | 2016057984 | 4/2016 |
| WO | 2015086824 | 6/2016 |

OTHER PUBLICATIONS

Blei, , Topic models. Text mining: classification, clustering, and applications 10.71 (2009): 34., 2009.

Chang, et al., Using topic keyword clusters for automatic document clustering. IEICE Transactions on Information and Systems 88.8 (2005) 1852-1860, 2005.

Chang, Jonathan et al., Reading tea leaves: How humans interpret topic models. Advances in neural information processing systems. 2009.

Gunther, Elisabeth et al., Word Counts and Topic Models: Automated text analysis methods for digital journalism research. Digital Journalism 4.1 (2016): 75-88., 2016.

Heinrich, Gregor , Parameter estimation for text analysis. University of Leipzig, Tech. Rep (2008).

Holloway, et al., Analyzing and visualizing the semantic coverage of Wikipedia and its authors. Complexity 12.3 (2007): 30-40., 2007.

Huh, Seungil et al., Discriminative topic modeling based on manifold learning. ACM Transactions on Knowledge Discovery from Data (TKDD) 5.4 (2012): 20., 2012.

Khalifa, Osama et al., Multi-objective topic modeling. Evolutionary Multi-Criterion Optimization. Springer Berlin Heidelberg, 2013., 2013.

Mei, Qiaozhu et al., Automatic labeling of multinomial topic models. Proceedings of the 13th ACM SIGKDD international conference on Knowledge discovery and data mining. ACM, 2007., 2007.

Porter, Alan et al., Text clumping for technical intelligence. INTECH Open Access Publisher, 2012., 2012.

Steyvers, Mark et al., Probabilistic topic models. Handbook of latent semantic analysis 427.7 (2007): 424-440., 2007.

* cited by examiner

100

200

300

400

600

700

800

N-dimensional Charts for N-bias dimensions
Additional Detail

1100

DATA ANALYTICS SYSTEM AND METHODS FOR TEXT DATA

FIELD OF THE DISCLOSURE

The subject disclosure relates to a system and method for analyzing a plurality of text documents.

BACKGROUND

Text analytics is a holistic approach that converts data into insights and the insights into business outcome. The text analytics market size is estimated to grow in the next few years. Automated analysis of large volume of text data can be performed in many ways. For example, traditional comment survey analysis is done by an expert reviewing the text and identifying major topics. Automated discovery of meaning in vast amounts of text data through characterizing one or more aspects of the text is considered difficult.

BRIEF DESCRIPTION OF THE DRAWINGS

Reference will now be made to the accompanying drawings, which are not necessarily drawn to scale, and wherein.

DETAILED DESCRIPTION

Figure 1:
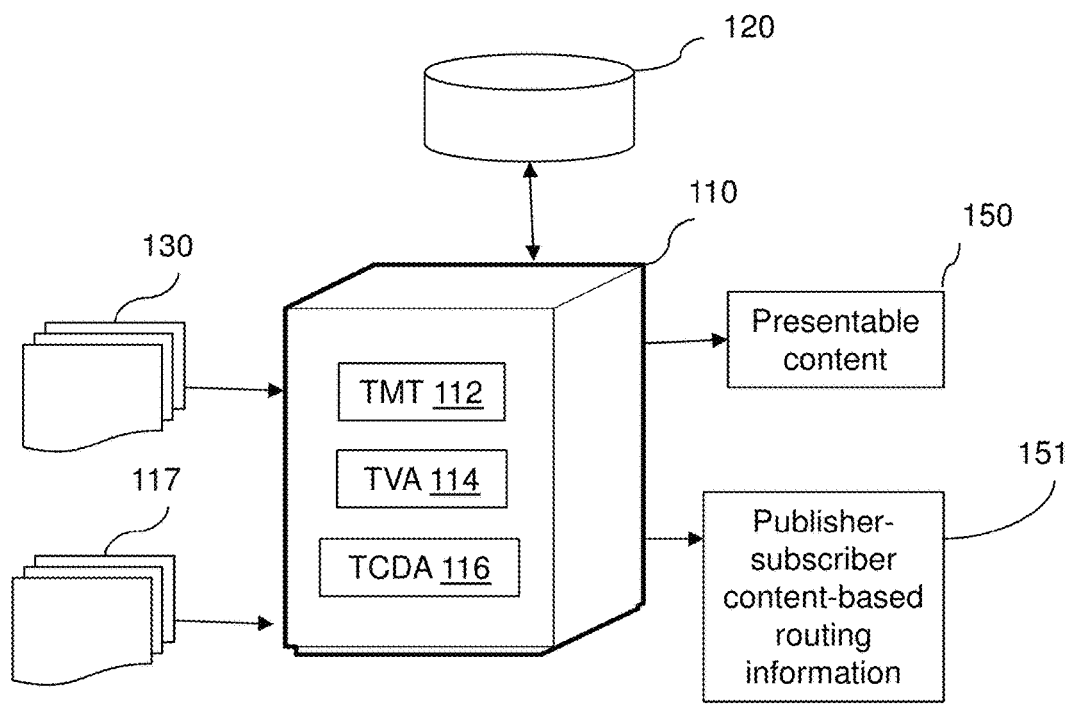
FIG. 1 depicts an illustrative embodiment of a system for analyzing a plurality of text documents.

The subject disclosure describes, among other things, illustrative embodiments for analysis of unstructured data. A processing system invokes a first software tool that performs a statistical natural language processing analysis on a plurality of text documents to determine a plurality of topics and further utilizes a second software tool that analyzes the text document to determine whether a bias are present in the text. The processing system then generates presentable content summarizing the topics found and all or a subset of the bias dimensions. The topics and bias data resulting from the text analytics can be further analyzed with co-collected structured data for statistical relationships. The topics and n-dimensions of bias data resulting from the text analytics can be used for a publisher-subscriber network that uses content-driven routing when delivering both raw data and summarized or visualized data in an electronic format from a network. Other embodiments are described in the subject disclosure.

One or more aspects of the subject disclosure include a computer that performs a statistical natural language processing analysis on a plurality of text documents to determine a plurality of topics, creates a proper subset of topics from the plurality of topics, maps one or more topics in the proper subset of topics to each document in the plurality of text documents, thereby creating a plurality of topic-document pairs, identifies n-dimensions of bias for each topic-document pair from the text, creates clusters of topics from the proper subset of topics, and generates presentable content depicting each cluster of the clusters of topics according to a corresponding image configuration, performs statistical analysis on the combination of the resulting text analytics and any co-collected structured data and generates presentable content depicting relationships and data inconsistencies. The topics and n-dimensions of bias data resulting from the text analytics can be used for a publisher-subscriber network that uses content-driven routing when delivering both raw data and summarized or visualized data in an electronic format from the network.

One or more aspects of the subject disclosure include determining a plurality of topics from a plurality of text documents; mapping one or more topics in the proper subset of topics to each document in the plurality of text documents; reducing the plurality of topics into a proper subset of topics based on a frequency of occurrence of each topic in the plurality of text documents; identifying n-dimensions of bias for each topic in the proper subset of topics, the n-dimensions of bias identified from text in a corresponding document mapped to the topic; creating clusters of topics from the proper subset of topics, wherein each cluster of topics in the clusters of topics is determined from a latent semantic analysis comprising singular value decomposition into orthogonal dimensions, wherein each cluster of topics has an image configuration based on all or a subset of the n-dimensions of bias and the frequency of occurrence for topics in the clusters of topics that distinguishes one cluster from another; and generating presentable content illustrating each cluster of the clusters of topics according to a corresponding image configuration, performs statistical analysis on the combination of the resulting text analytics and any co-collected structured data and generates presentable content depicting relationships and data inconsistencies. The topics and n-dimensions of bias data resulting from the text analytics can be used for a publisher-subscriber network that uses content-driven routing when delivering both raw data and summarized or visualized data in an electronic format from the network.

One or more aspects of the subject disclosure include performing, by a system comprising a processor, a latent Dirichlet allocation of a plurality of text documents to determine a plurality of topics; creating, by the system, a proper subset of topics from the plurality of topics, based on user input; creating, by the system, a plurality of topic-document pairs mapping, by the system, one or more topics in the proper subset of topics to each document in the plurality of text documents, thereby creating a plurality of topic-document pairs; performing, by the system, a latent semantic analysis of text in the document of each topic-document pair to determine n-dimensions of bias for each topic-document pair; creating, by the system, clusters of topics from the proper subset of topics, wherein each cluster of topics is determined from the n-dimensions of bias of each topic-document pair and a frequency of occurrence of each topic in the plurality of text documents; and generating, by the system, presentable content that illustrates each cluster of the clusters of topics according to a corresponding image configuration, wherein the image configuration is based on all or a subset of the n-dimensions of bias and the frequency of occurrence of topics in a cluster that distinguishes the cluster from other clusters, performs statistical analysis on the combination of the resulting text analytics and any co-collected structured data and generates presentable content depicting relationships and data inconsistencies. The topics and n-dimensions of bias data resulting from the text analytics can be used for a publisher-subscriber network that uses content-driven routing when delivering both raw data and summarized or visualized data in an electronic format from the network.

FIG. 1 depicts an illustrative embodiment of a system for analyzing a plurality of text documents. As shown in FIG. 1, system 100 comprises a computer 110 and a database 120. The computer 110 and database 120 may comprise a plurality of computers and storage devices, as set forth in more detail below in connection with FIG. 16. System 100 is configured to process unstructured data, such as documents 130. Documents 130 may comprise fielded data in the form of text strings, such as comment data, status data, periodic satisfaction surveys, project management reports, trouble ticket logs, etc. Co-collected structured data 117 may comprise fielded and structured data that is collected with documents 130. System 100 converts the unstructured data contained in documents 130 into structured data according to topics contained within the unstructured data. The structured data is then semantically evaluated to determine n-dimensions of bias set forth in the data. The system performs statistical analysis on the combination of the resulting text analytics and any co-collected structured data. The data is summarized into presentable content 150 comprising a visualization of the topics and on all or a subset of the n-dimensions of bias contained within the data. Finally, the topics and n-dimensions of bias data resulting from the text analytics can be used for a publisher-subscriber network that uses content-driven routing when delivering both raw data and summarized or visualized data in an electronic format via the network.

Computer 110 comprises a plurality of software processing modules for performing processing tasks. As shown in FIG. 1, computer 110 comprises a topic model tool, TMT 112, a tool for verbatim analysis, TVA 114, and a tool for cross data analysis, TCDA 116. TMT 112 performs a natural language processing statistical analysis of the unstructured data in documents 130 to discern topics within the data and create structured data from the unstructured data. TVA 114 provides a precise view of the topics to enable automated and human assisted semantic analysis of the data, and automated generation of presentable content 150. TCDA 116 performs statistical analysis on the combination of the resulting text analytics and any co-collected structured data.

An author of a document generally has a particular topic in mind when he or she writes the document. Thus, the whole document may be limited to a single topic, or the document may be a mixture of a small number of topics. Each word written would then be attributed to one of the document's topics. By observing the words in a document, and their frequency of occurrence, TMT 112 can determine the likely probability that a word is attributed to one particular topic or another.

An example framework for processing text in documents 130 is a "bag-of-words" framework in which a block of text is transformed into a vector of word counts based on a predetermined set of words called a dictionary. For example, consider a sentence, "The IT department completed the project on time and under budget" and a dictionary stored in database 120 composed of the five words: "budget, department, task, project, manager." The corresponding vector of word counts is [1, 1, 0, 1, 0]. Similarly, vectors of word counts can be constructed from any set of documents comprising text. In the "bag-of-words" framework, the order of the words may be ignored. By iteratively processing the documents 130 through such natural language statistical analysis, TMT 112 can discover likely topics by looking for groups of words that occur together within the same document frequently. In addition, TMT 112 provides the ability to perform pre-processing on the text in the documents, such as eliminating spurious punctuation, removing infrequent words and stop words (those that are deemed irrelevant to any discovered topics), replacing patterns of text specified using regular expressions with user-defined substitutions, or the like. TMT 112 can also generate a dictionary from all the words contained in the documents 130, and store the dictionary in database 120. TMT 112 can synthesize topics that may be represented as patterns of words that usually appear together in documents, in word pairs or word groupings. Latent Dirichlet Allocation (LDA) is a Bayesian unsupervised learning algorithm for analyzing a set of documents that TMT 112 may deploy to discover topics from the text in the documents 130. TMT 112 can identify the most common words in the vocabulary, and indicate the frequency of occurrence of words in the documents 130. Strange words that do not add meaning to the documents 130 can be removed by specifying a regular expression to extract them from the documents in the pre-processing phase. Parameters defining the natural language statistical analysis process performed by TMT 112 may be stored in database 120.

The parameters stored in database 120 adjust the level of generalization imparted to the analysis performed by TMT 112. If the parameters lead TMT 112 to generate too many topics, i.e., the level of generalization may be too fine, then the parameters may be tuned to reduce the number of topics generated, and the statistical analysis process performed by TMT 112 may be repeated in an iterative fashion. As the processing may be quite extensive, TMT 112 may be trained on a sample of the data to initialize the parameters before performing the full analysis on all of the documents 130.

TVA 114 evaluates the documents 130 to create a mapping between each document in documents 130 and one or more topics determined by TMT 112, thereby creating a topic-document pair. TVA 114 may store the topic-document pair mapping in database 120. TVA 114 may create a model view of structure data created by TVA 114, known as a rubric, for each document in documents 130. The rubric permits review of the text data in the document and an illustration of the mapping of text data within the document and the one or more topics. TVA 114 provides the rubric for efficient data scanning by topic experts to ensure the accuracy of the topics generated, their mappings, and the structured data created. Should an adjustment be needed to the topics, processing by TVA 114 may be suspended and returned to TMT 112 for further evaluation of topics.

Each topic is evaluated across the entire set of the documents 130 by analysis of the n-dimensions of bias for each topic-document pair. Each bias dimension can be coarsely grained (i.e., positive, neutral, negative). A coarsely grained bias reflects the mood or perception of the author with respect to a topic. In addition to positive/neutral/negative, other scaling may be used, such as like/dislike, acceptable/unacceptable, approve/reject, beneficial/wasteful, benign/malignant, or the like that indicate the author's perception of a topic or an outcome being favorable (preferred) or unfavorable (not preferred). Alternatively, a bias dimension can be more finely grained (i.e., Strongly Agree (5), Agree (4), Neutral (3), Disagree (2), Strongly Disagree (1)). In addition, a bias dimension can be tagged as unknown, which may not be factored into the results. A bias dimension can be determined by natural language semantic analysis. The semantic analysis may include keyword assessment in the text from the document associated with the topic. The semantic analysis may also include and interpretive assessment of the text from the document associated with the topic. The analytics may include synonym and antonym tables for bias assessment. Adjectives such as "slow" or phrases such as "takes too long" reflect an unfavorable outcome or performance from the author's perspective. Furthermore, existence and proximity of negatives such as "don't," "seldom," or "never" can reverse the meaning, e.g., "resolves quickly" and "was never slow to resolve" both reflect a favorable viewpoint of the author. Another example is "needs to improve" which reflects an unfavorable viewpoint on the topic. In some cases, the same adjective can be both favorable and unfavorable. An example of this would be "low" where "low cost" would reflect a favorable viewpoint and "low production level" would reflect an unfavorable viewpoint. The analysis can adjust for a bias indicator word or phrase, such as an adjective, or words that provide context to the topic. The analysis can generate an indicator for the visualization that shows a direction of positive bias. Further, the semantic analysis may reveal that the topic-document pair mapping may be erroneous, and that the text relates to a different topic through an implied analysis, in which case the mapping can be repaired. TVA 114 may include the bias in the rubric for efficient data scanning by topic experts to ensure the accuracy of the n-dimensions of bias found in each topic-document pair. Including the n-dimensions of bias in the rubric is a great help by simply indicating what topics are finding favor (what is going well) and disfavor (areas of improvement), which can be used by the business to quickly pinpoint best practices and focus areas for improvement that will dramatically improve a business operation or customer perception.

TVA 114 then creates clusters of topics from the topics identified by TMT 112, wherein each cluster of topics is determined from the n-dimensions of bias of each topic-document pair and a frequency of occurrence of each topic in the document identified by the topic-document pair. The clustering of topics may be performed using a singular value decomposition into an orthogonal dimensional model based on the n-dimensions of bias and/or the discrete or continuous ranges of each bias dimension values. TVA 114 creates the orthogonal dimensional model from the structured data created. The aggregation of frequency and each of the n-dimensions of bias of each topic can be aligned to the original document and to other dimensions, such as following customer-supplier relationship, to provide a Pareto chart view of most significant to least significant topics. This aggregation allows a clearer understanding of topics, where results are most favorable, and which topics are most unfavorable to the document author. This type of analysis enables a clearer understanding of which activities are performed well and which need improvement.

Finally, TVA 114 utilizes visualization techniques to translate data into easily consumed information that provides business value. TVA 114 achieves this goal by creating presentable content 150 comprising a summary view of the documents 130 for topic distribution using the orthogonal dimensional model. A variety of visualizations may provide a sense of relative importance of each topic as well as the n-dimensions of bias. Numerous other graphical formats may be used that focus on either the single topics alone, or a single topic and sub-topics. In these cases, the graphical representations may illustrate a variety of the n-dimensions of bias within a single topic or sub-topic, or the temporal change of bias for a single topic or sub-topic. Visualizations illustrating temporal changes can be helpful to a reviewer seeking to determine what operational changes have been beneficial to an organization, by noting an improved bias from negative to positive, and indications where changes or neglect have led to an increase in negative bias. Furthermore, the system may incorporate stratification, such as filtering by a subdivision of an organization or by document authors, in the visualizations generated by the system. Such customization of the graphical visualizations and reports may provide unique and tailored reporting, especially for visualization of the effectiveness of targeted improvements. Many examples of visualization can be used to display the information that results from text analytics. High level and summary exemplary views may include heat maps, average bias Pareto or radar charts, bubble charts using different data aspects for the axes, chord diagrams, word clouds, modified co-occurrence matrices and n-dimensional graphing methods (such as matrix scatter plot, 3D or more plots, parallel coordinate plots, or Andrew's plot). Other visualization techniques can provide additional detail supplementing the high level and summary views by including additional exemplary views such as stack or donut/ring/pie charts, barbell charts, stacked column flow charts, spark lines, meters, sunburst diagrams and node-link tree diagrams. Visualization of topic and bias anomalies may be presented from the above-identified examples as well as tabular methods of data display. Visualization for the statistical assessment of the relationship between the text analytics data and the co-collected structured data may be provided from the above-identified examples, in particular those views that represent correlation such as scatter plots and matrix scatter plots. An exemplary layout of presentable content 150 is set forth in more detail below.

TCDA 116 then provides additional statistical analysis from the resultant text analytics generated by TVA 114 and any co-collected structured data 117. The analysis provided by TCDA 116 can support data validation. For example, in a project tracking system, the structured data may show a value of "green" indicating that the project is on track, however text in the status field may describe that resources are not available and that work is not progressing. In another example, a particular work center may perform significantly better than others, and the combined analysis of structured and text data from a workflow system may provide insight on how to leverage the better performance of the particular work center. Exemplary methods of analysis may include correlation, 2-sample t, outlier detection, Mood's median tests and chi-square test for independence.

Figure 2:
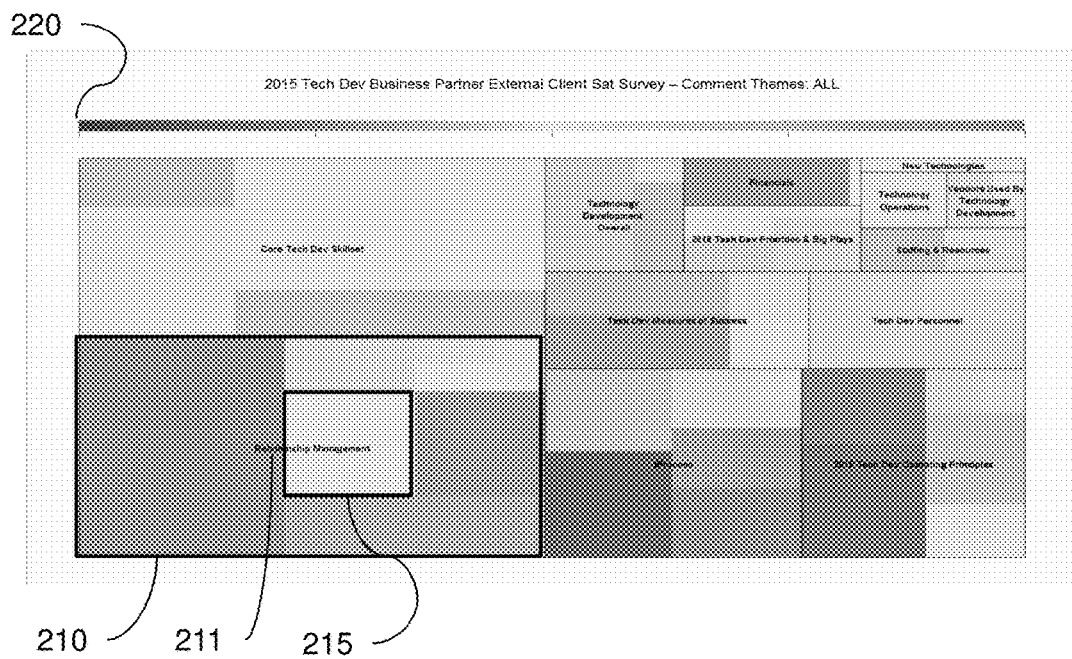
FIG. 2 depicts an illustrative embodiments of presentable content generated by the system of FIG. 1.

FIG. 2 depicts an exemplary layout 200 of presentable content 150 generated by the system 100 of FIG. 1. As shown in FIG. 2, presentable content 150 comprises a heat map comprising a plurality of clustered topics 210, a title 211 for each cluster, a topic area 215 within the clustered topics 210, and a bias legend 220. Each topic area 215 can be a geometric area that illustrates the bias and frequency of occurrence of the topic or another summary statistic within the documents 130. In this exemplary layout 200, each cluster has a title 211, such as "Relationship Management." In addition, the size of the topic area 215 denotes the frequency of occurrence of the topic within the documents 130 in this exemplary layout 200. Similarly, the area of the clustered topics 210 denotes the frequency of occurrence of all of the topics in the clustered topics 210 within the documents 130. Also in this exemplary layout, the color of the topic area 215 denotes the net or average bias of the topic from the text data within particular documents of the documents 130 that are mapped to the topic represented by topic area 215. The net or average bias levels can be computed in many ways. In the exemplary layouts, the biases have values of negative, neutral, and positive, and the net bias level for each topic is computed by subtracting the negative count from the positive count. Bias legend 220 provides a range of biases, illustrated by color, for each topic. In this exemplary layout, the biases colored red are most negative and the biases colored green are most positive, with neutral bias illustrated yellow, and varying degrees of bias in-between. For example, the topic area 215 indicates an overall neutral bias (yellow color). The arrangement of topic areas, such as topic area 215, and clustered topics may be accomplished by Pareto analysis of bias associated with each topic and clustered topics. For example, the most frequently occurring topic will be located in the lower left region of the clustered topics 210, and conversely, the less frequently occurring topics will be located in the upper right area. The aggregated frequency of occurrence of the topics in the clustered topics 210 can be likewise arranged in the exemplary layout 200.

Figure 3:
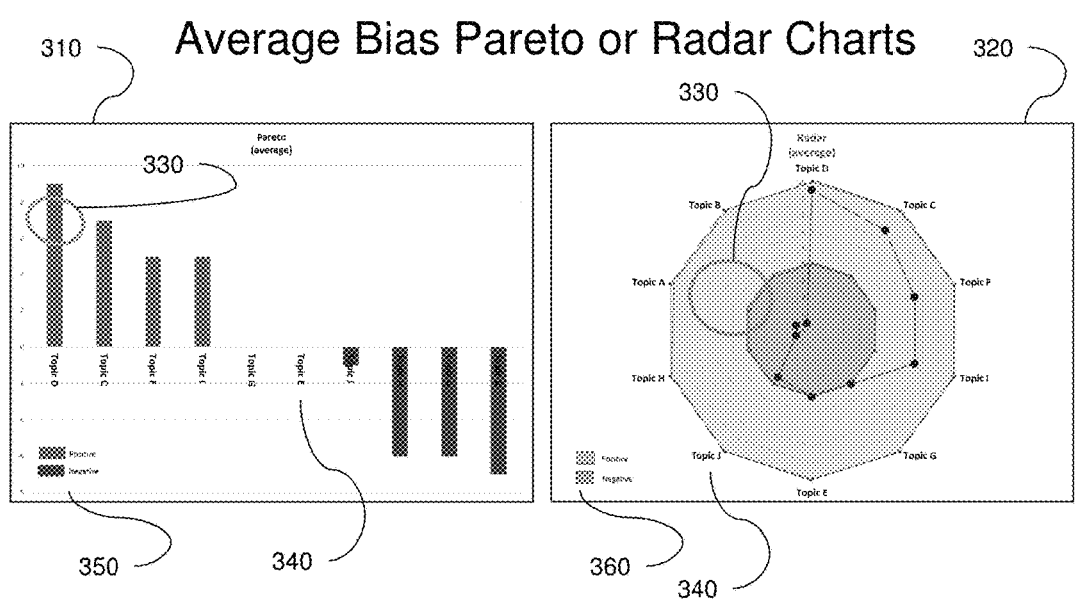
FIG. 3 depicts an illustrative embodiments of presentable content generated by the system of FIG. 1.

FIG. 3 depicts an exemplary layout 300 of presentable content 150 generated by the system 100 of FIG. 1. As shown in FIG. 3, presentable content 150 comprises either a Pareto chart 310 or Radar chart 320 comprising of the net or average bias level counts per topic 330, a title 340 for each topic and a bias legend 350 or bias zone legend 360. The net or average bias levels can be computed in many ways, in the exemplary layouts, the biases have values of negative, neutral, positive and the net bias level for each topic is computed by subtracting the negative count from the positive count. Each topic can be represented by the net or average bias value of the topic within the documents 130. Each chart may also group all or portion of topics into meta-topics. In these exemplary layouts 300, generic topics are shown which could represent either topics or meta topics. Bias legend 350 defines the discrete values for the biases, whereas bias zone legend 360, represents areas, or bias zones. The arrangement of topics for the Pareto chart is done based on largest to smallest net or average bias level, topics are then arranged left to right. The radar chart can follow the ordering in a clockwise fashion of the Pareto chart, or any other method of arranging the topics around the circle. The exemplary radar chart is also shown with highlighting to emphasize the positive and negative regions, which demonstrates banding for the bias regions/levels.

Figure 4:
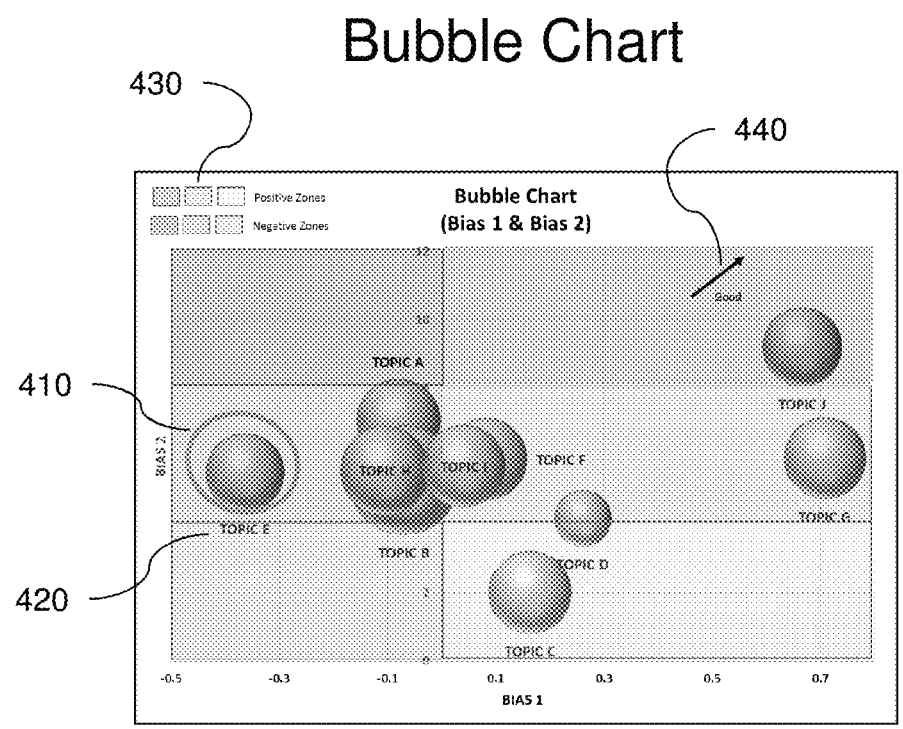
FIG. 4 depicts an illustrative embodiments of presentable content generated by the system of FIG. 1.

FIG. 4 depicts an exemplary layout 400 of presentable content 150 generated by the system 100 of FIG. 1. As shown in FIG. 4, presentable content 150 comprises a bubble chart comprising of a bubble 410, a title 420 for each topic, a bias zone legend 430, and a directionality of good indicator 440. The position of the bubble in the chart is based on the average bias levels for two bias dimensions and the size of the bubble is based on the overall count of documents 130 that contain the topic. Each chart may also group all or portion of topics into meta-topics. In this exemplary layout 400, generic topics are shown which could represent either topics or meta topics. The bias zone legend 430 represents bias zones. For this exemplary chart, the regions are varying degrees of positive and negative. For further clarity, the chart may also contain a directionality of goodness indicator 440.

Figure 5:
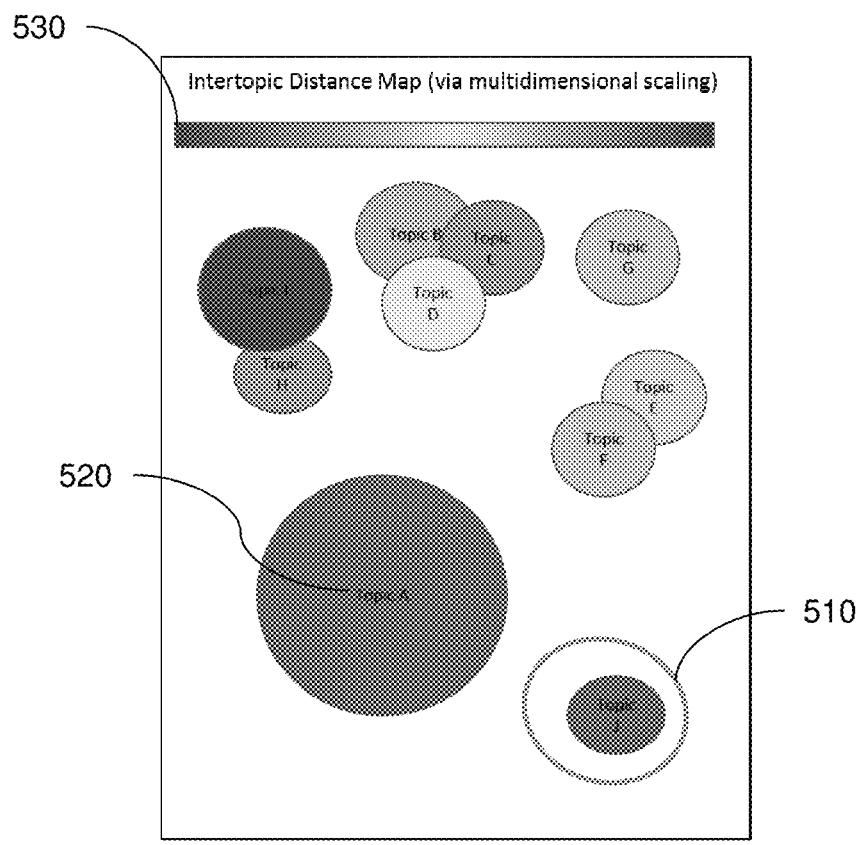
FIG. 5 depicts an illustrative embodiments of presentable content generated by the system of FIG. 1.

FIG. 5 depicts an exemplary layout 500 of presentable content 150 generated by the system 100 of FIG. 1. As shown in FIG. 5, presentable content 150 comprises a Bubble chart comprising of a bubble 510, a title 520 for each topic and a bias legend 530. The position of the bubble in the chart is based on the statistical coincidence of topics within documents and the size of the bubble is based on the overall count of documents 130 that contain the topic. Each bubble includes a color indicating a net or average bias level. The net or average bias levels can be computed in many ways, in the exemplary layouts, the biases have values of negative, neutral, positive and the net bias level for each topic is computed by subtracting the negative count from the positive count. Each chart may also group all or portion of topics into meta-topics. In this exemplary layout 500, generic topics are shown that could represent either topics or meta topics. Bias legend 530 provides a range of biases, illustrated by color, for each topic. In this exemplary layout, the biases colored red are most negative and the biases colored green are most positive, with neutral bias illustrated yellow, and varying degrees of bias in-between.

Figure 6:
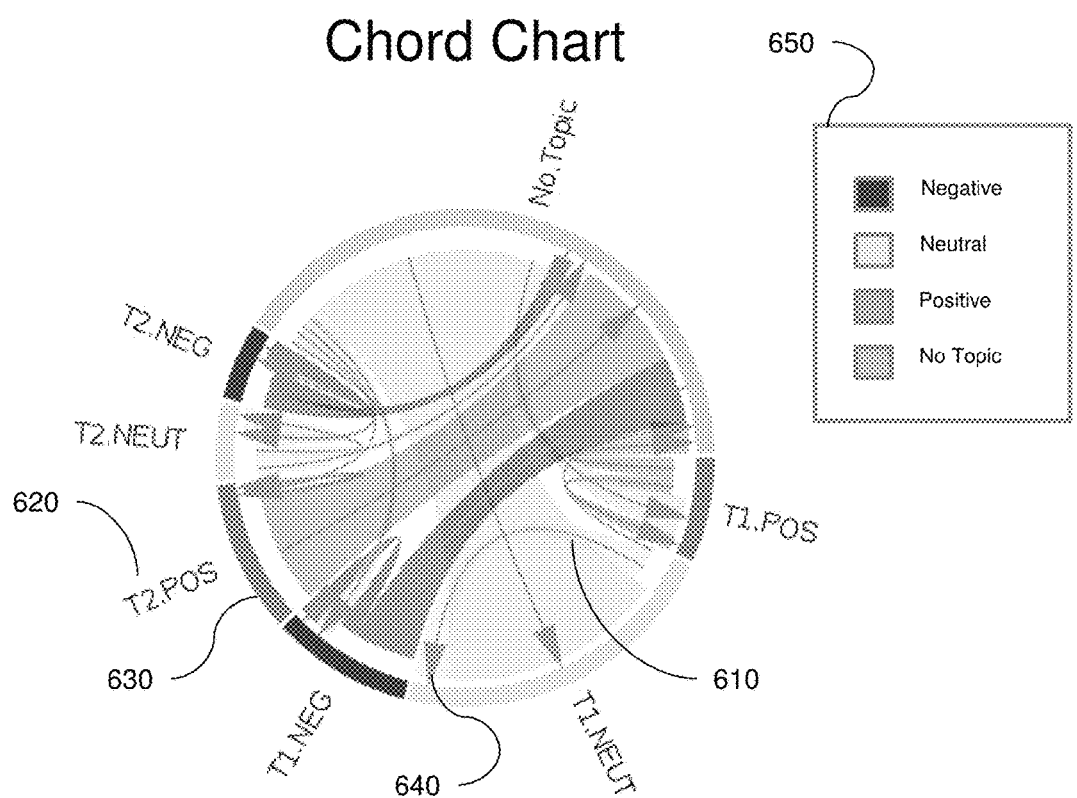
FIG. 6 depicts an illustrative embodiments of presentable content generated by the system of FIG. 1.

FIG. 6 depicts an exemplary chart 600 of presentable content 150 generated by the system 100 of FIG. 1. As shown in FIG. 6, presentable content 150 comprises a Chord chart comprising of a chord 610, a title 620 for each topic or Topic/Bias value combination, an outer arc 630, an arrow 640, and a bias legend 650. The width of the chords and the outer arcs in the chart are based on counts of documents 130 in this exemplary layout including the topic/bias combination. Each chord 610 and outer arc 630 is colored according to bias level when topic/bias combinations are used. This exemplary chart 600 shows a trend or movement within a population using both the chord 610 and the arrow 640. The movement is based on an identifier within documents 130 that supports a determination of a trend. Each chart may also group all or portion of topics into meta-topics. In this exemplary chart 600, generic topics are shown that could represent either topics or meta topics. Bias legend 650 provides a range of biases, illustrated by color. This exemplary view also shows that in a trending scenario a member of the population may have not offered a topic in either the 1st or 2nd cycle of observation.

Figure 7:
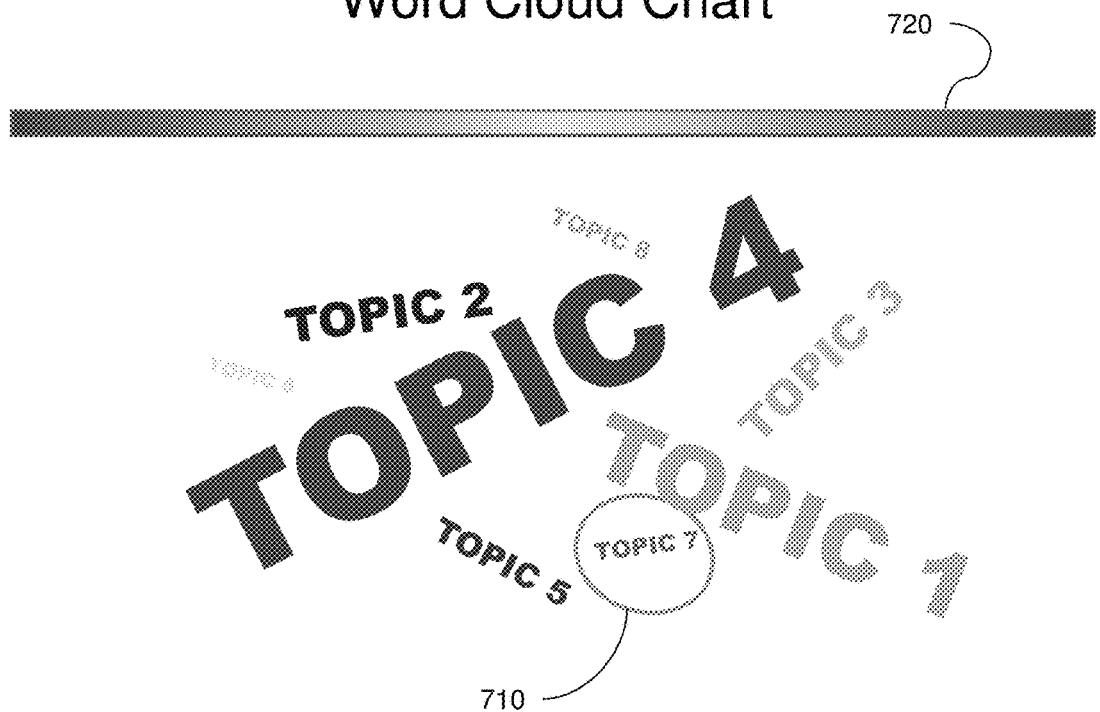
FIG. 7 depicts an illustrative embodiments of presentable content generated by the system of FIG. 1.

FIG. 7 depicts an exemplary layout 700 of presentable content 150 generated by the system 100 of FIG. 1. As shown in FIG. 7, presentable content 150 comprises a Word Cloud chart comprising of words, titles, for each topic 710, and a bias legend 720. The net or average bias levels can be computed in many ways, in the exemplary layouts, the biases have values of negative, neutral, positive and the net bias level for each topic is computed by subtracting the negative count from the positive count. Each topic can be represented by the net or average bias value of the topic within the documents 130. Each chart may also group all or portion of topics into meta-topics. In this exemplary layout 700, generic topics are shown that could represent either topics or meta topics. Bias legend 720 provides a range of biases, illustrated by color, for each topic. In this exemplary layout, the biases colored red are most negative and the biases colored green are most positive, with neutral bias illustrated yellow, and varying degrees of bias in-between.

Figure 8:
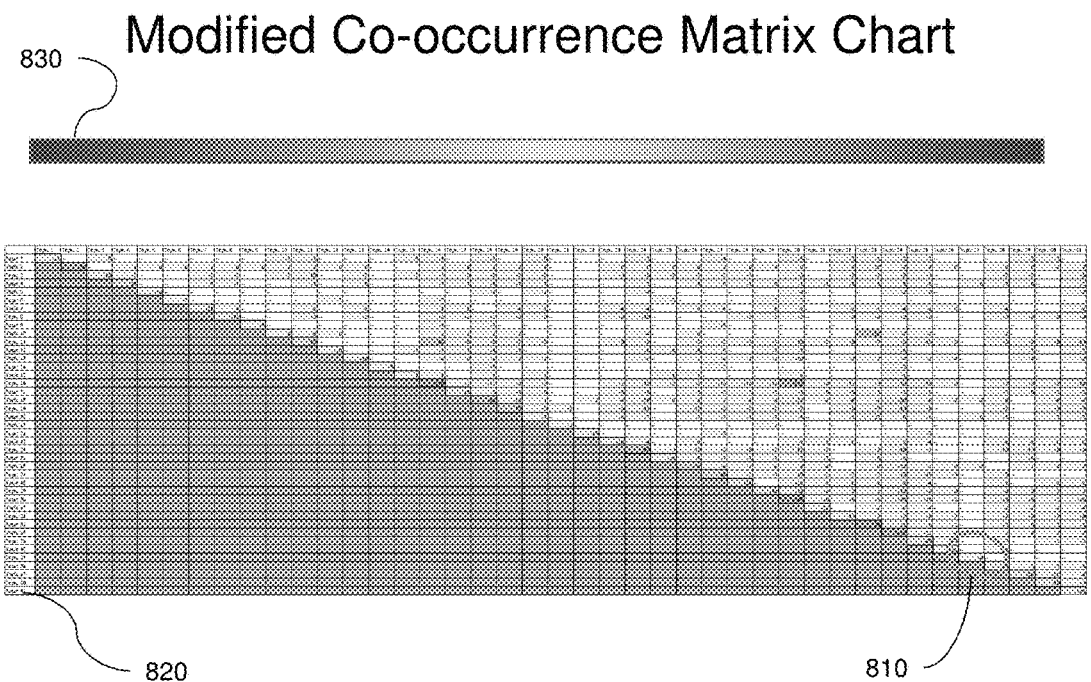
FIG. 8 depicts an illustrative embodiments of presentable content generated by the system of FIG. 1.

FIG. 8 depicts an exemplary layout 800 of presentable content 150 generated by the system 100 of FIG. 1. As shown in FIG. 8, presentable content 150 comprises a Modified Co-occurrence Matrix chart comprising of cells containing average or net bias levels 810, per topic pair, a title 820 for each topic and a bias legend 830. The net or average bias levels can be computed in many ways, in the exemplary layouts, the biases have values of negative, neutral, positive and the net bias level for each topic is computed by subtracting the negative count from the positive count. Each topic can be represented by the net or average bias value of the topic within the documents 130. Each chart may also group all or portion of topics into meta-topics. In this exemplary layout 800, generic topics are shown that could represent either topics or meta topics. Bias legend 830 provides a range of biases, illustrated by color, for each topic. In this exemplary layout, the biases colored red are most negative and the biases colored green are most positive, with neutral bias illustrated yellow, and varying degrees of bias in-between.

Figure 9:
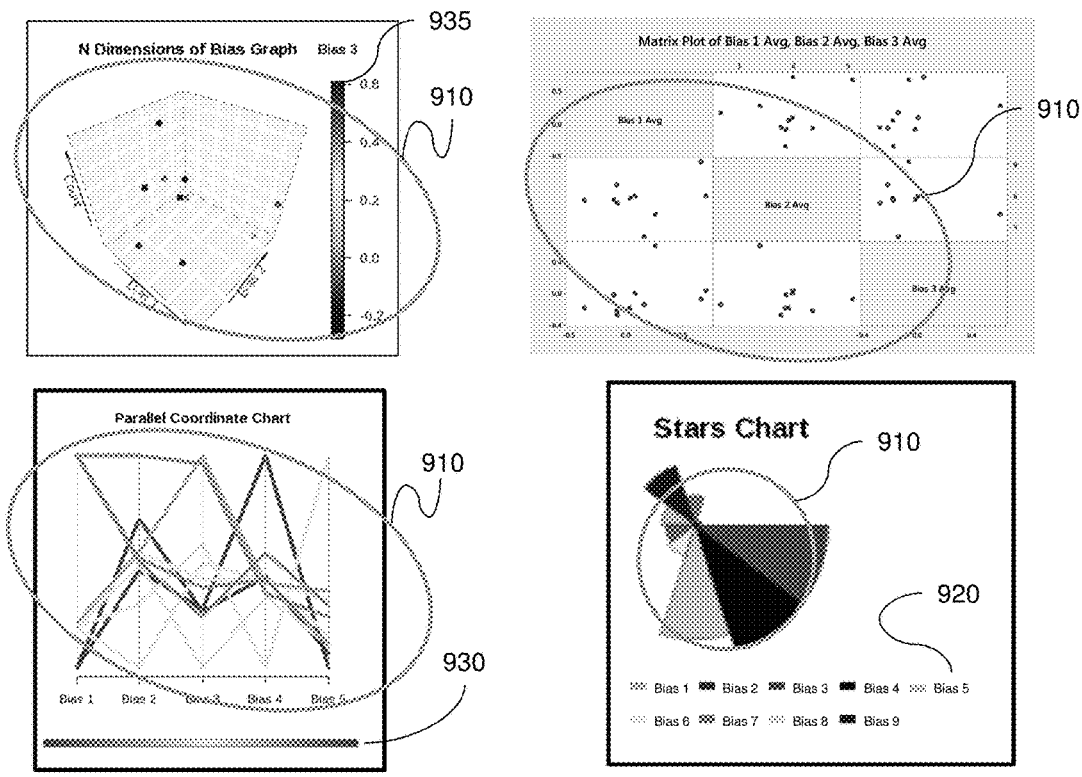
FIG. 9 depicts an illustrative embodiments of presentable content generated by the system of FIG. 1.

FIG. 9 depicts an exemplary layout 900 of presentable content 150 generated by the system 100 of FIG. 1. As shown in FIG. 9, presentable content 150 comprises a N-dimensional charts (3D charts, matrix scatter plots, parallel coordinate or Andrew's plot charts, star charts), comprising of visual representations of numerical values for n-dimensions of bias 910, a discrete legend 920 and continuous value legends 930 and 935. Each bias 910 can be represented by counts for each topic within the documents 130, and the bias value. Each chart may also group all or portion of topics into meta-topics. In these exemplary layouts 900, generic topics are shown that could represent either topics or meta topics. Discrete legend 920 provides a discrete set of biases. In this exemplary layout, the biases uniquely for each bias. Continuous value legend 930 provides a range of biases, illustrated by color, for each topic. In this exemplary layout, the biases colored red are most negative and the biases colored green are most positive, with neutral bias illustrated yellow, and varying degrees of bias in-between. Continuous value legend 935 provides a range of biases, illustrated by color, for each topic. In this exemplary layout, the biases colored dark blue is bias 3=0 and dark red for bias 3=0.6 and varying degrees of bias in-between. An additional dimension can be charted by using colors to represent values for a bias.

Figure 10:
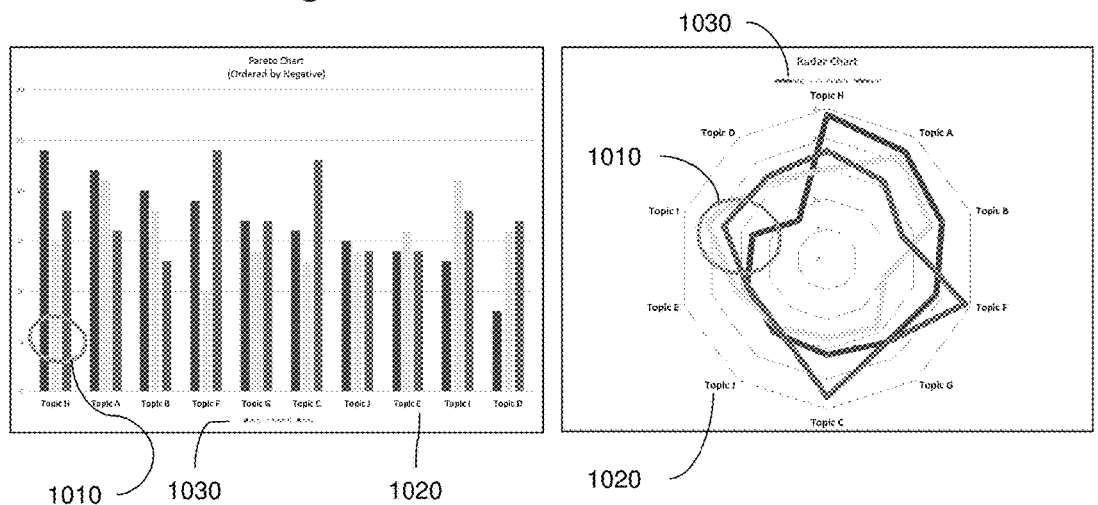
FIG. 10 depicts an illustrative embodiments of presentable content generated by the system of FIG. 1.

FIG. 10 depicts an exemplary layout 1000 of presentable content 150 generated by the system 100 of FIG. 1. As shown in FIG. 10, presentable content 150 comprises either a Pareto or Radar chart comprising of the counts 1010, per bias value per topic, a title 1020 for each topic and a bias legend 1030. Each topic can be represented by the counts of each individual bias value and frequency of occurrence of the topic within the documents 130 or can be filtered to show a subset of the bias values. Each chart may also group all or portion of topics into meta-topics. In these exemplary layouts 1000, generic topics are shown that could represent either topics or meta topics. Bias legend 1030 defines the discrete values for the biases. The arrangement of topics for the Pareto chart is done based on choosing a particular bias value, topics are then arranged left to right, highest frequency of chosen bias value to lowest value. The radar chart can follow the ordering in a clockwise fashion of the Pareto chart, or any other method of arranging the topics around the circle.

Figure 11:
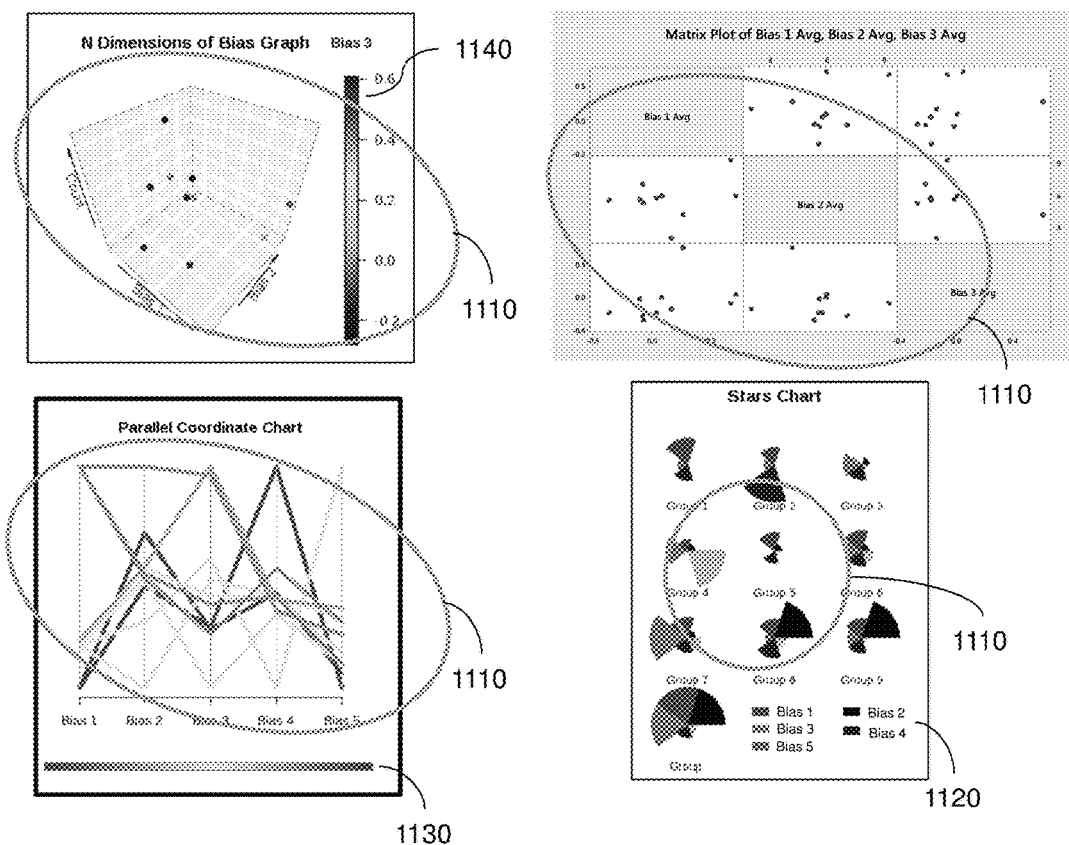
FIG. 11 depicts an illustrative embodiments of presentable content generated by the system of FIG. 1.

FIG. 11 depicts an exemplary layout 1100 of presentable content 150 generated by the system 100 of FIG. 1. As shown in FIG. 11, presentable content 150 comprises a N-dimensional charts (3D charts, matrix scatter plots, parallel coordinate or Andrew's plot charts, star charts), comprising of visual representations of numerical values for n-dimensions of bias 1110, a discrete legend 1120 and continuous value legends 1130 and 1140. Each bias can be represented by counts for each topic within the documents 130, and their bias value. Each chart may also group all or portion of topics into meta-topics. In these exemplary layouts 1100, generic topics are shown that could represent either topics or meta topics. Discrete legend 1120 provides a discrete set of biases. In this exemplary layout, the biases uniquely for each bias. Continuous value legend 1130 provides a range of biases, illustrated by color, for each topic. In this exemplary layout, the biases colored red are most negative and the biases colored green are most positive, with neutral bias illustrated yellow, and varying degrees of bias in-between. Continuous value legend 1140 provides a range of biases, illustrated by color, for each topic. In this exemplary layout, the biases colored dark blue is bias 3=0 and dark red for bias 3=0.6 and varying degrees of bias in-between. An additional dimension can be charted by using colors to represent values for a bias.

Figure 12:
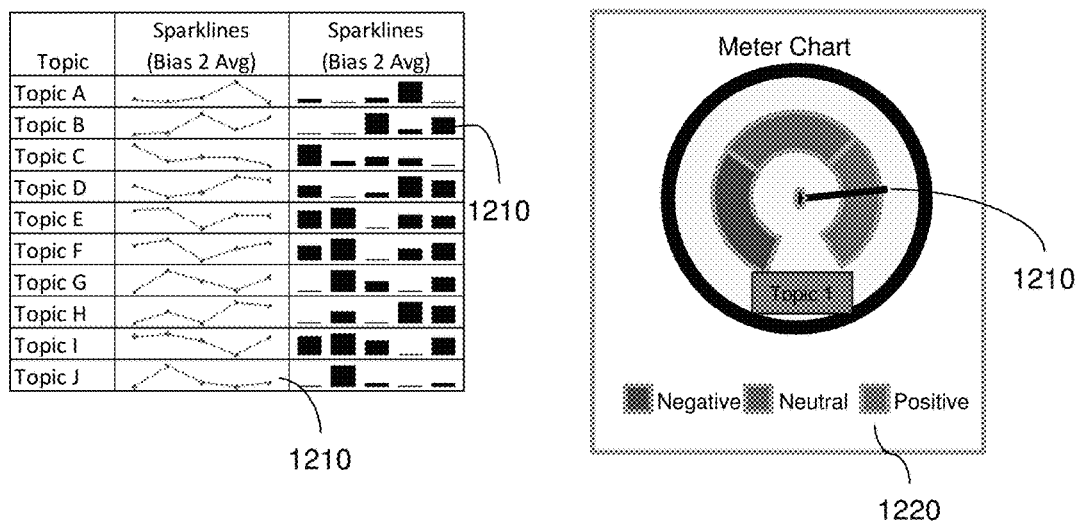
FIG. 12 depicts an illustrative embodiments of presentable content generated by the system of FIG. 1.

FIG. 12 depicts an exemplary layout 1200 of presentable content 150 generated by the system 100 of FIG. 1. As shown in FIG. 12, presentable content 150 comprises trending charts (spark lines, meter charts), comprising visual representations of the bias level for a single topic 1210 and a discrete legend 1220. Each bias level view can be represented by counts for each topic within the documents 130, and their bias value. Discrete legend 1220 provides a discrete set of biases.

Figure 13:
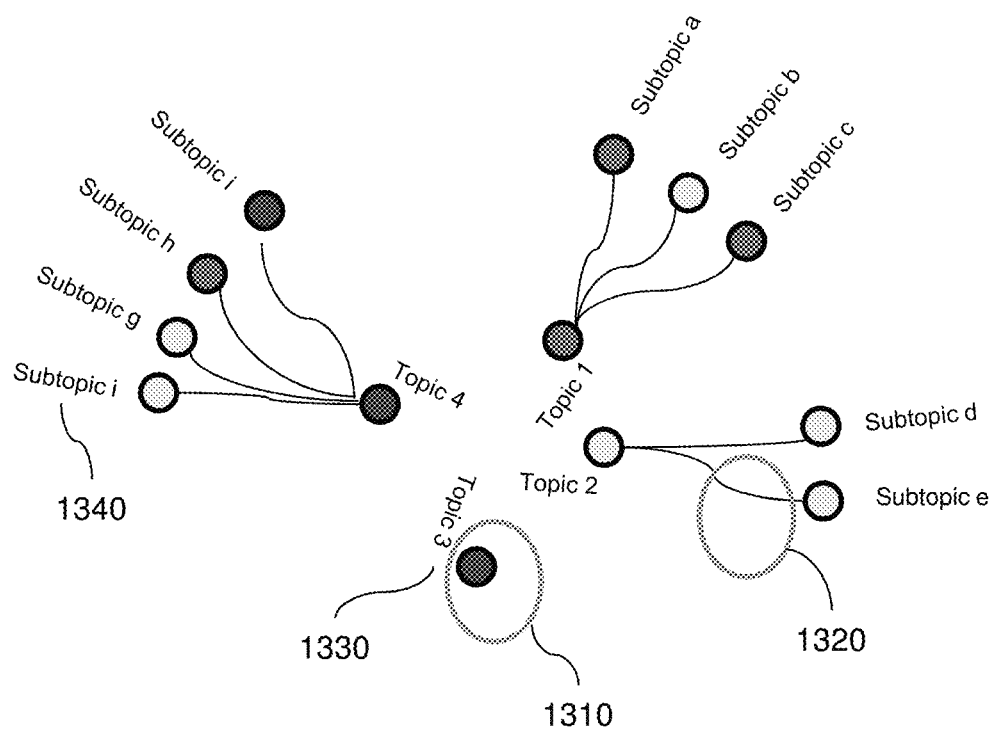
FIG. 13 depicts an illustrative embodiments of presentable content generated by the system of FIG. 1.

FIG. 13 depicts an exemplary layout 1300 of presentable content 150 generated by the system 100 of FIG. 1. As shown in FIG. 13, presentable content 150 comprises exemplary chart (node-link tree diagram), comprising of the net or average bias level 1310, per topic, an indicator of relationship between topic and subtopic 1320, a title 1330 for each topic, a title 1340 for each subtopic and a bias legend (not illustrated). The net or average bias levels can be computed in many ways, in the exemplary layouts, the biases have values of negative, neutral, positive and the net bias level for each topic is computed by identifying the maximum bias level, ties involving neutral and negative or positive are resolved by using the negative or positive value, all other ties result in the neutral category.

Figure 14:
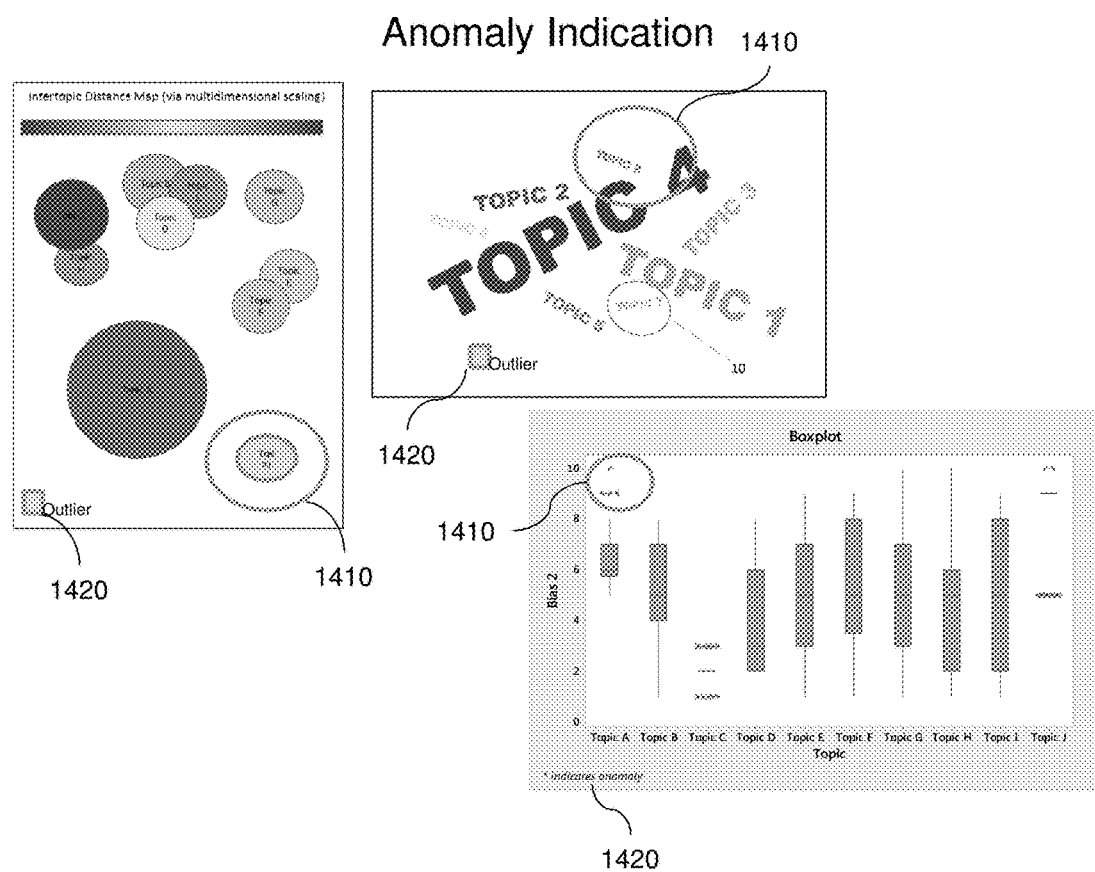
FIG. 14 depicts an illustrative embodiments of presentable content generated by the system of FIG. 1.

FIG. 14 depicts an exemplary layout 1400 of presentable content 150 generated by the system 100 of FIG. 1. As shown in FIG. 14, presentable content 150 comprises exemplary charts, comprising of visualization of the dataset including any anomaly within the data set 1410 and a unique identifier for anomalies 1420.

Figure 15:
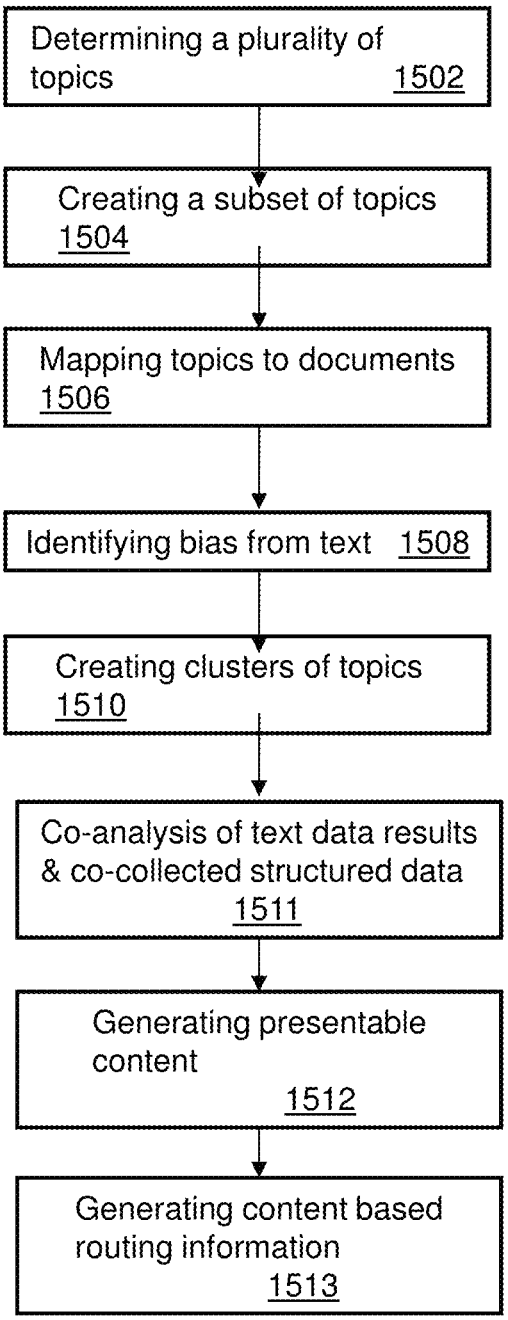
FIG. 15 depicts an illustrative embodiment of a method used in portions of the system described in FIG. 1.

FIG. 15 depicts an illustrative embodiment of a method 1500 used by system 100 to process unstructured text data in the documents 130 to produce presentable content 150. The process starts with step 1502, where the system 100 determines a plurality of topics from the documents 130. The system may determine the plurality of topics through a statistical natural language processing analysis, such as a latent Dirichlet allocation, as described above.

In step 1504, the system 100 creates a subset of topics from the plurality of topics determined in step 1502. The subset of topics may be a proper subset, or alternatively may include all of the topics determined in the plurality. For example, topics having a low frequency of occurrence in the documents 130 may be excluded from the subset, since such topics would have little relevance. Low frequency topics may also be the focus of the study when used for anomaly detection. As another example, topics that might be similar could be merged into a single topic, where such similarity can be gauged by use of a dictionary stored in database 120. Additionally, automated topic merging and exclusion may be augmented by user input to merge two topics or more. The purpose of step 1504 is to ensure that neither too few topics are created, nor too many By creating a subset of topics, an appropriate number of topics can be derived from the documents 130.

In step 1506, the system 100 maps each document in the documents 130 to one or more topics in the subset of topics, thereby creating topic-document pairs, as described above.

In step 1508, the system 100 identifies n-dimensions of bias for each topic in the subset of topics. The n-dimensions of bias may include one of positive bias, neutral, or negative bias, or may be more finely grained, as described earlier.

In step 1510, the system 100 creates clusters of topics. The topic clustering may be performed by singular value decomposition into orthogonal dimensions, as described above.

In step 1511, the system 100 identifies the strength of a statistical relationship between the text analytics data and any co-collected structured data. Exemplary methods include correlation, 2-sample t, outlier detection, Mood's median, and chi-square test for independence.

In step 1512, the system 100 generates presentable content 150 using an image configuration. The may image configurations may comprise size, shape, color coding, or any combination thereof. In particular, the image configuration may comprise an area for each cluster in the clusters of topics. The image configuration may specify that a size of an area for each cluster in the clusters of topics represents the frequency of occurrence of each topic in the clusters of topics. The image configuration may also specify that the area for each cluster in the clusters of topics is subdivided into separate areas for each topic in a cluster in the clusters of topics, wherein a separate area for a topic represents the frequency of occurrence of the topic in the cluster. The image configuration may also specify that the separate area for the topic further comprises a color that represents a bias dimension of the topic. The image configuration may also use a Pareto analysis of bias dimension associated with each topic in each cluster of the clusters of topics.

While for purposes of simplicity of explanation, the respective processes are shown and described as a series of blocks in FIG. 15, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 16:
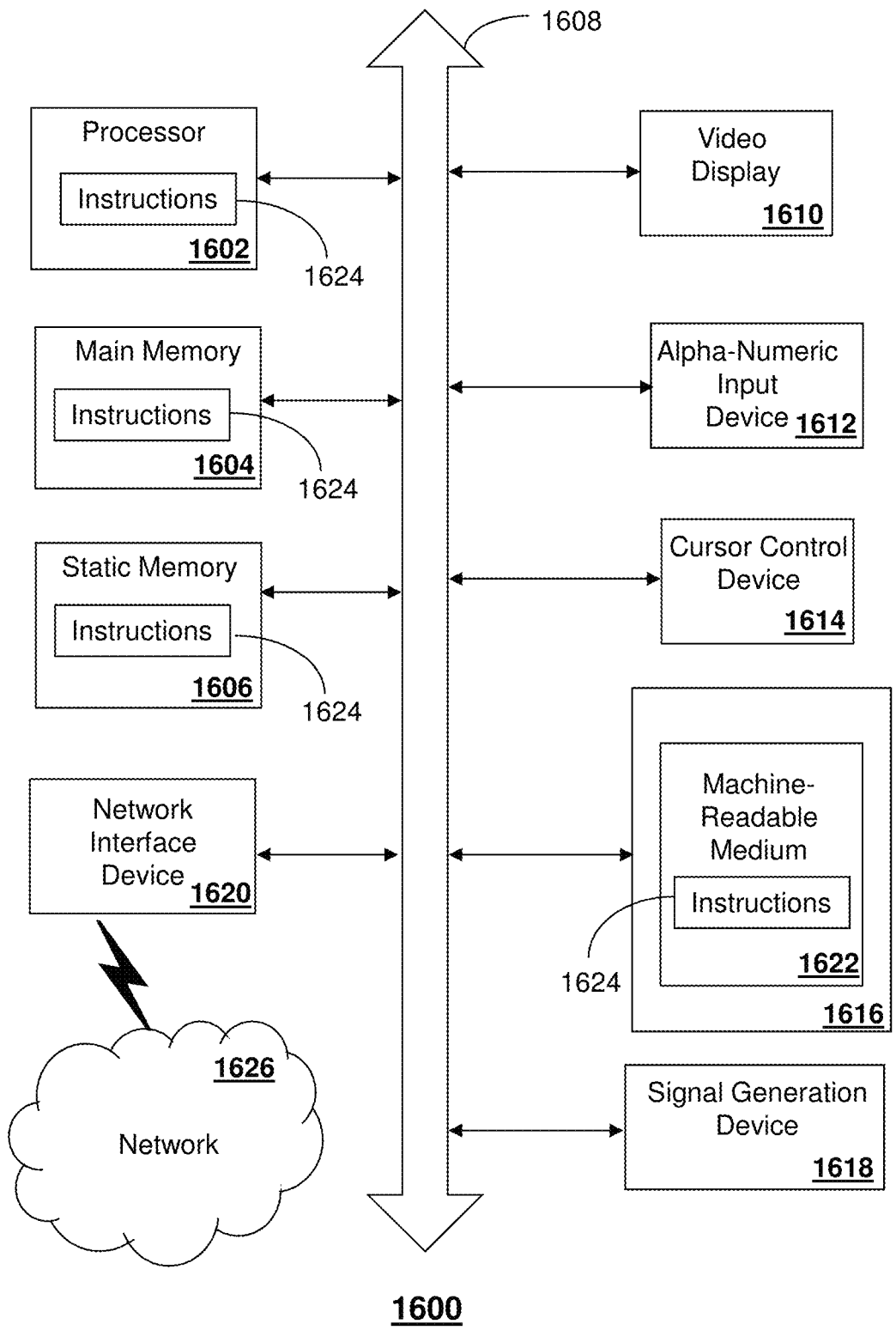
FIG. 16 is a diagrammatic representation of a machine in the form of a computer system within which a set of instructions, when executed, may cause the machine to perform any one or more of the methods described herein.

FIG. 16 depicts an exemplary diagrammatic representation of a machine in the form of a computer system 1600 within which a set of instructions, when executed, may cause the machine to perform any one or more of the methods described above. One or more instances of the machine can operate, for example, as the computer 110 and/or database 120 illustrated in FIG. 1. In some embodiments, the machine may be connected (e.g., using a network 1626) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1600 may include a processor 1602, also known as a controller (e.g., a central processing unit (CPU)), a graphics processing unit (GPU), or both), a main memory 1604 and a static memory 1606, which communicate with each other via a bus 1608. The computer system 1600 may further include a display unit 1610 (e.g., a liquid crystal display (LCD), a flat panel, or a solid state display). The computer system 1600 may include an input device 1612 (e.g., a keyboard), a cursor control device 1614 (e.g., a mouse), a disk drive unit 1616, a signal generation device 1618 (e.g., a speaker or remote control) and a network interface device 1620. In distributed environments, the embodiments described in the subject disclosure can be adapted to utilize multiple display units 1610 controlled by two or more computer systems 1600. In this configuration, presentations described by the subject disclosure may in part be shown in a first of the display units 1610, while the remaining portion is presented in a second of the display units 1610.

The disk drive unit 1616 may include a tangible computer-readable storage medium 1622 on which is stored one or more sets of executable instructions (e.g., software 1624) embodying any one or more of the methods or functions described herein, including those methods illustrated above. The instructions 1624 may also reside, completely or at least partially, within the main memory 1604, the static memory 1606, and/or within the processor 1602 during execution thereof by the computer system 1600 to facilitate a performance of operations resulting in the one or more methods or functions described herein. The main memory 1604 and the processor 1602 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, ZigBee®), and long-range communications (e.g., WiMAX, GSM, CDMA, LTE) can be used by computer system 1600. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

Upon reviewing the aforementioned embodiments, it would be evident to an artisan with ordinary skill in the art that said embodiments can be modified, reduced, or enhanced without departing from the scope of the claims described below. For example, each text document in the plurality of text documents may be separated into individual sentences before processing. This technique becomes advantageous when document authors respond to many topics and provide a mixture of bias dimensions and values. Such separation helps identify topics that may be hidden when multiple topics are present in a single text document. In addition, a mixture of bias dimensions and values set forth in a single text document will be more clearly identified when preprocessing occurs on a sentence basis. In an alternative embodiment, the batch processing of the plurality of text documents as set forth above may be modified to process a stream of text documents, or processing on a rolling basis. In one embodiment, the organization of document authors may be included in the analysis for the purposes of cross referencing between subdivisions of document authors and subdivisions of a business entity to which the document authors' comments pertain. For example, the system may cross reference a client document author and suppliers, i.e., business subdivision that provide services to the client document author. This cross referencing is not limited to just client and supplier, but can easily be extended to other dimensions including projects, products, applications, levels of management, ages, education level, and any other demographic information which can be reliably tied to the document author or the service provider. As another example, any changes to the document author organization can be included in the analysis. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
   a processing system including a processor; and
   a memory that stores executable instructions that, when executed by the processing system, facilitate performance of operations, comprising:
   performing a statistical natural language processing analysis on a plurality of text documents to determine a plurality of topics, wherein prior to performing the statistical natural language processing analysis, a training is performed on sample documents to determine parameters for the statistical natural language processing analysis;
   creating a proper subset of topics from the plurality of topics, based on user input;
   mapping a topic in the proper subset of topics to each document in the plurality of text documents, thereby creating a plurality of topic-document pairs;
   for each topic-document pair of the plurality of topic-document pairs, identifying a bias from text in a corresponding document of the topic-document pair;
   creating clusters of topics from the proper subset of topics, wherein each cluster of topics is determined from the bias of each topic-document pair and a frequency of occurrence of each topic in the document identified by the topic-document pair, and wherein the clusters of topics have an image configuration based on the bias and the frequency of occurrence that distinguishes one cluster from another; and
   generating presentable content depicting each cluster of the clusters of topics according to a corresponding image configuration, wherein the image configuration specifies that an area for each cluster of topics is subdivided into separate sub-areas for each topic, wherein the sub-area for each topic represents a frequency of occurrence of that topic.

2. The device of claim 1, wherein the image configuration comprises size, shape, color coding, or any combination thereof.

3. The device of claim 2, wherein the presentable content includes a Pareto analysis of bias associated with each topic in each cluster of the clusters of topics.

4. The device of claim 3, wherein the image configuration comprises an area for each cluster in the clusters of topics.

5. The device of claim 4, wherein a size of the area for each cluster in the clusters of topics represents the frequency of occurrence of each topic in the clusters of topics.

6. The device of claim 5, wherein the area for each cluster in the clusters of topics is subdivided into separate areas for each topic in a cluster in the clusters of topics, wherein a separate area for a topic represents the frequency of occurrence of the topic in the cluster.

7. The device of claim 6, wherein the separate area for the topic further comprises a color that represents the bias of the topic.

8. The device of claim 7, wherein identifying the bias of each topic-document pair comprises a latent semantic analysis.

9. The device of claim 8, wherein identifying the bias comprises one of positive bias, neutral, or negative bias.

10. The device of claim 9, wherein the statistical natural language processing analysis comprises a latent Dirichlet allocation.

11. The device of claim 10, wherein the processing system includes a plurality of processors operating in a distributed processing environment.

12. A non-transitory computer-readable storage medium, comprising executable instructions that, when executed by a processing system including a processor, facilitate performance of operations, comprising:
  performing training on a plurality of sample documents to determine parameters for further analysis in order to control a number of topics determined by the further analysis, the further analysis comprising:
    determining a plurality of topics from a plurality of text documents;
    mapping one or more topics in the plurality of topics to each document in the plurality of text documents;
    reducing the plurality of topics into a proper subset of topics based on a frequency of occurrence of each topic in the plurality of text documents;
    identifying n-dimensions of bias for each topic in the proper subset of topics, the n-dimensions of bias identified from text in a corresponding document mapped to the topic;
    creating clusters of topics from the proper subset of topics, wherein each cluster of topics in the clusters of topics is determined from a latent semantic analysis comprising singular value decomposition into orthogonal dimensions, wherein each cluster of topics has an image configuration based on the n-dimensions of bias and the frequency of occurrence for topics in the clusters of topics that distinguishes one cluster from another; and
    generating presentable content illustrating each cluster of the clusters of topics according to a corresponding image configuration.

13. The non-transitory computer-readable storage medium of claim 12, wherein the image configuration comprises a geometric area for a topic in a cluster of topics.

14. The non-transitory computer-readable storage medium of claim 13, wherein a size of the geometric area for the topic in the cluster of topics represents a summary statistic in the plurality of text documents comprising the topic.

15. The non-transitory computer-readable storage medium of claim 14, wherein a color of the geometric area for the topic in the cluster of topics represents the n-dimensions of bias of the topic from the plurality of text documents associated with the topic.

16. The non-transitory computer-readable storage medium of claim 12, wherein the processing system includes a plurality of processors operating in a distributed processing environment.

17. The non-transitory computer-readable storage medium of claim 12, wherein identifying the n-dimensions of bias comprises one of positive bias, neutral, or negative bias.

18. A method, comprising:
  performing, by a system comprising a processor, a latent Dirichlet allocation of a plurality of text documents to determine a plurality of topics, wherein the plurality of topics are determined according to parameters, wherein the parameters are determined by training on a sample of documents in order to control a number of the plurality of topics that are determined;
  creating, by the system, a proper subset of topics from the plurality of topics, based on user input;
  mapping, by the system, one or more topics in the proper subset of topics to each document in the plurality of text documents, thereby creating a plurality of topic-document pairs;
  performing, by the system, a latent semantic analysis of text in the document associated with each topic-document pair to determine n-dimensions of bias for each topic-document pair;
  creating, by the system, clusters of topics from the proper subset of topics, wherein each cluster of topics is determined from a value for each bias dimension of each topic-document pair and a frequency of occurrence of each topic in the plurality of text documents; and
  generating, by the system, presentable content that illustrates each cluster of the clusters of topics according to a corresponding image configuration, wherein the image configuration is based on all or a subset of the bias dimensions and the frequency of occurrence of topics in a cluster that distinguishes the cluster from other clusters.

19. The method of claim 18, wherein the latent semantic analysis comprises singular value decomposition into orthogonal dimensions.

20. The method of claim 18, wherein the user input comprises merging two topics.

* * * * *